Aug. 15, 1950  H. H. BALZER  2,518,855
CATTLE GUARD GATE
Filed Nov. 7, 1947  2 Sheets-Sheet 1
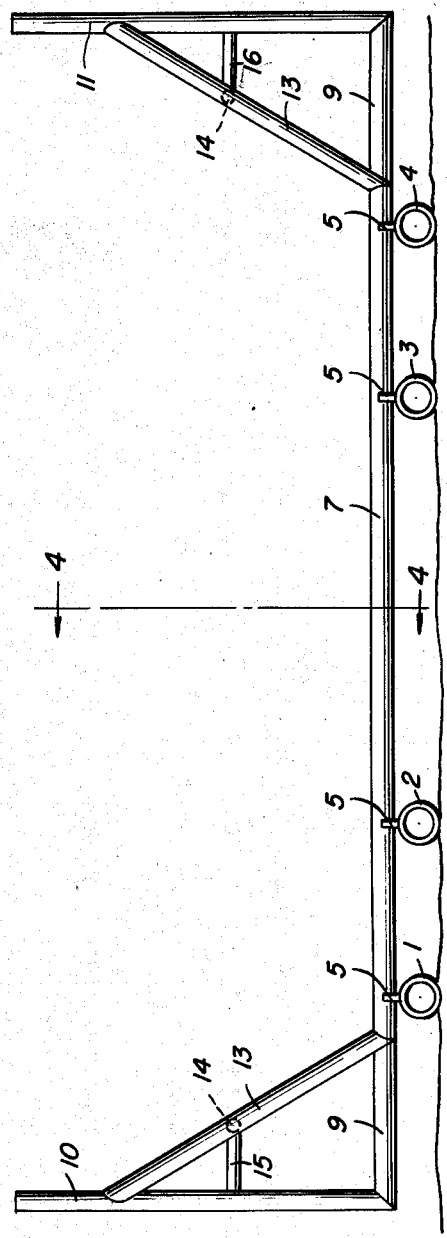
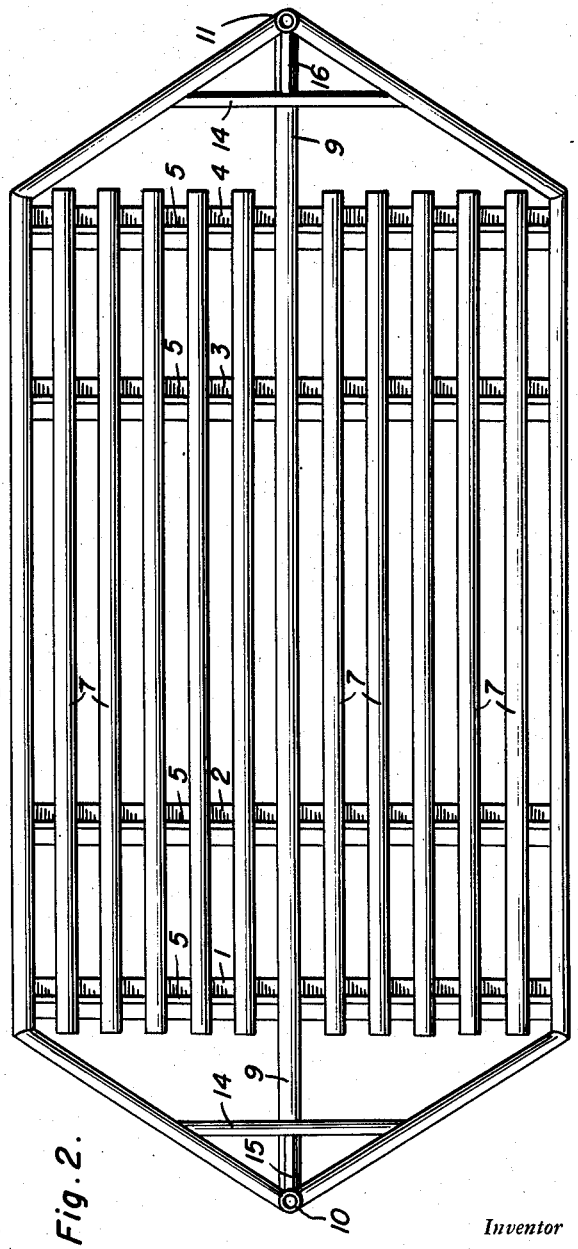
Fig.1.
Fig.2.
Inventor
Henry H. Balzer
By *Clarence A. O'Brien and Harvey B. Jacobson*
Attorneys

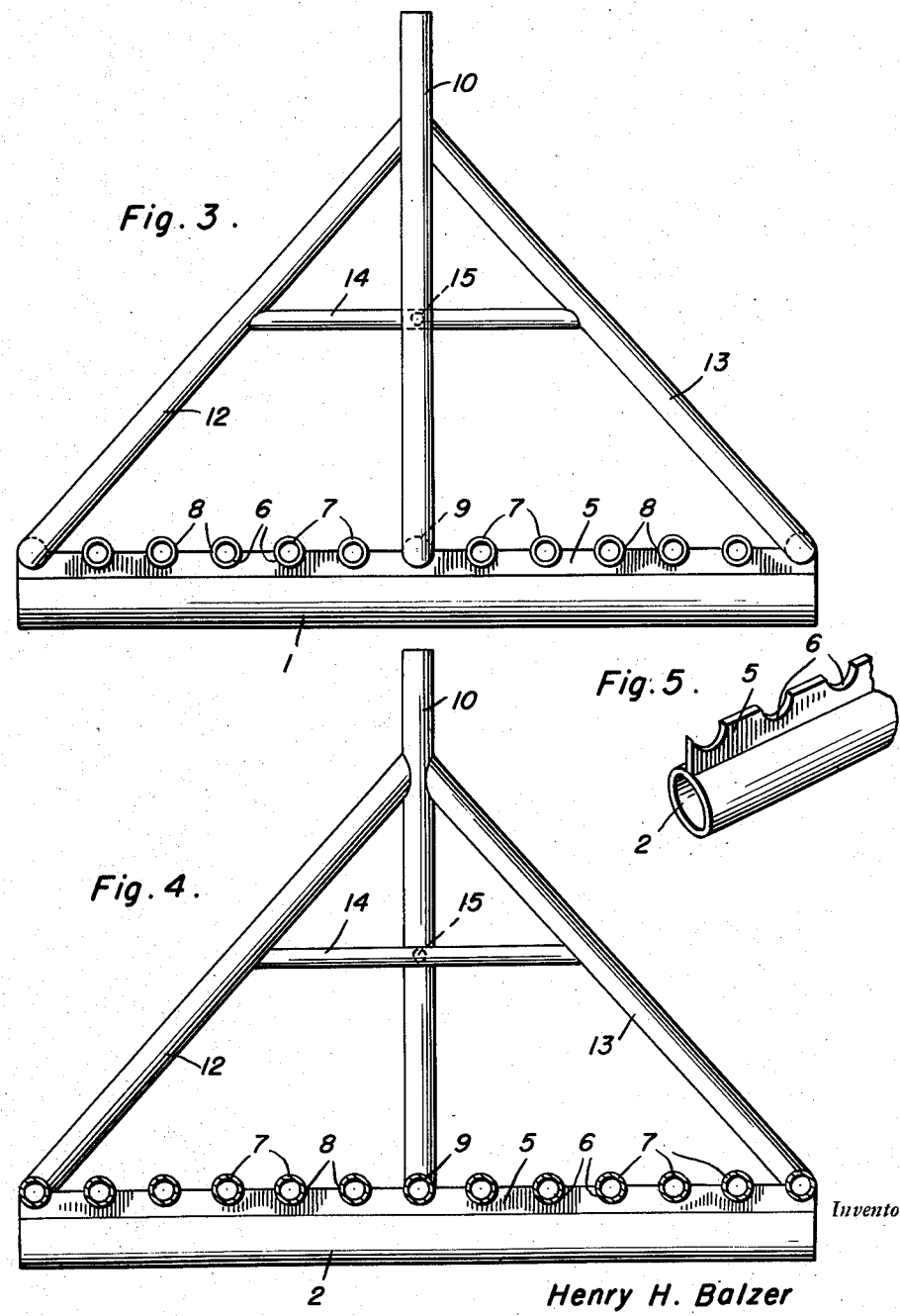

Patented Aug. 15, 1950

2,518,855

UNITED STATES PATENT OFFICE 2,518,855

CATTLE GUARD GATE

Henry H. Balzer, Perryton, Tex.

Application November 7, 1947, Serial No. 784,747

1 Claim. (Cl. 256—17)

This invention relates to improvements in cattle guard gates.

An object of the invention is to provide an improved cattle guard gate.

Another object of the invention is to provide an improved cattle guard gate for permitting the passing of an automobile through a fence while preventing the passage of cattle or other animals therethrough.

A further object of the invention is to provide a platform elevated above the ground level and disposed in a fence, having parallel spaced pipes arranged in alignment with the fence line, whereby an automobile may be driven over the pipes, but cattle and other animals will be afraid to walk over the spaced pipes, thus forming an efficient cattle guard gate.

A still further object of the invention is to provide an improved cattle guard gate which will be highly efficient in operation, and relatively inexpensive to manufacture and produce.

Other objects will appear as the description proceeds.

In the accompanying drawings which form a part of this application.

Figure 1 is a side elevation of the improved cattle guard gate;

Figure 2 is a plan view of the improved cattle guard gate;

Figure 3 is an end view of the improved cattle guard gate;

Figure 4 is a transverse sectional view taken on the line 4—4 of Figure 1, and;

Figure 5 is a perspective view of one end of a supporting pipe and notched rail.

Like characters of reference are used throughout the following specification and the accompanying drawings to designate corresponding parts.

In carrying out the invention, there are provided four transversely extending supporting pipes, 1, 2, 3 and 4 four inches in diameter and approximately six feet and three inches in length. These pipes are disposed at right angles to the fence line (not shown) and are spaced so that pipes 1 and 2, and pipes 3 and 4 are two feet apart, while pipes 2 and 3 are five feet apart.

Supporting rails 5 of the same length as the pipes 1, 2, 3 and 4 are welded to the upper surfaces thereof, and are approximately two and a half inches high and a quarter of an inch thick. A series of semi-circular seats 6 are cut in the upper edge of each rail 5 on six inch centers, and are adapted to receive and support the plurality of longitudinally extending main frame pipes 7 which extend parallel with the fence line (not shown), and are two and a half inches in diameter and approximately ten feet in length. These main frame pipes 7 are welded at 8 to the annular or semi-circular seats 6 in the upper edges of the supporting rails 5.

A center pipe 9 is welded in the central seats 6 and is two and one-half inches in diameter and fourteen feet long, extending beyond the opposite ends of the main frame or platform.

End posts 10 and 11 of two and one-half inches in diameter and four and one-half feet high are welded in vertical portion to the opposite ends of the center pipe 9, and are braced by the pair of two inch pipes 12 and 13 which are welded to the end posts 10 and 11 and to the outer ends of the outermost main frame pipes 7.

A cross brace pipe 14 is welded between the brace pipes 12 and 13, and steel rods 15 and 16 are welded between the cross brace pipes 15 and the end posts 10 and 11 to provide a substantial and rigid construction. The fence line (not shown) will be suitably attached to the end posts 10 and 11.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

A cattle guard gate including spaced parallel supporting pipes disposable at right angles to a fence line, supporting rails fixed to the upper surfaces of said supporting pipes and formed with spaced semi-circular seats in their upper edges, parallel main frame pipes supported in said seats and fixed therein, a central elongated main frame pipe extending beyond the opposite ends of the other main frame pipes, and vertical end posts secured to the ends of said central elongated main frame pipe, angular braces connected between said end posts and the ends of the outer main frame pipes, braces connected between said angular braces, and braces connected between said last mentioned braces and said end posts.

HENRY H. BALZER.

REFERENCES CITED

The following references are of record in the file of this patent:

UNITED STATES PATENTS

| Number | Name | Date |
|---|---|---|
| 506,242 | Lynch | Oct. 10, 1893 |
| 708,998 | Church | Sept. 16, 1902 |
| 751,957 | Sneider | Feb. 9, 1904 |
| 1,232,195 | Brager | July 3, 1917 |
| 1,312,861 | Morris | Aug. 12, 1919 |
| 1,329,357 | Baxter | Feb. 3, 1920 |
| 1,529,460 | Bremer | Mar. 10, 1925 |